Dec. 6, 1960   G. A. LYON   2,963,320
WHEEL COVER
Filed July 27, 1956   2 Sheets-Sheet 1

Inventor
GEORGE ALBERT LYON by Hill, Sherman, Meroni, Gross & Simpson
Attys

Dec. 6, 1960    G. A. LYON    2,963,320
WHEEL COVER
Filed July 27, 1956    2 Sheets-Sheet 2
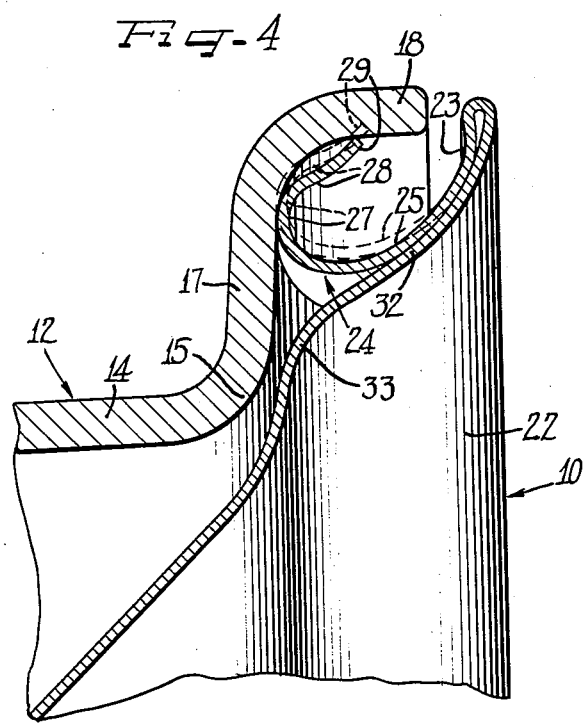
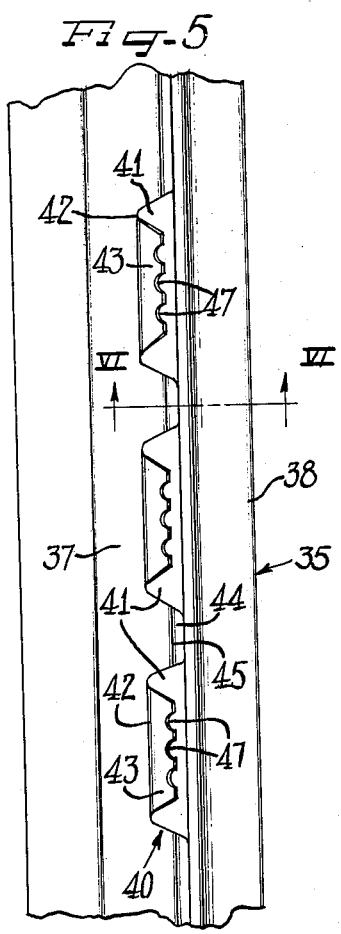
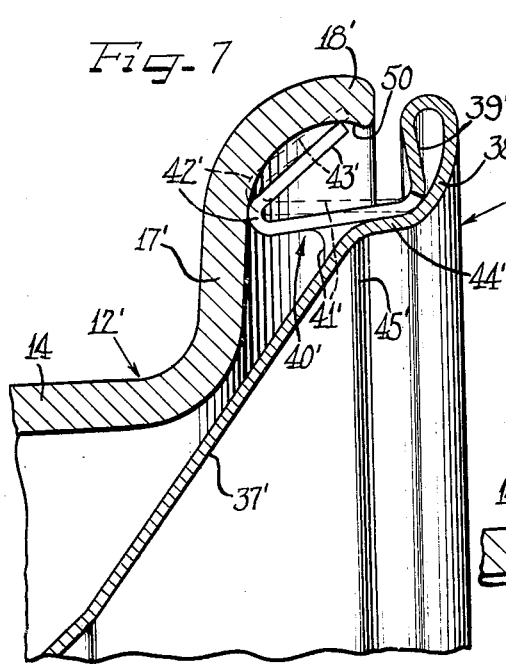
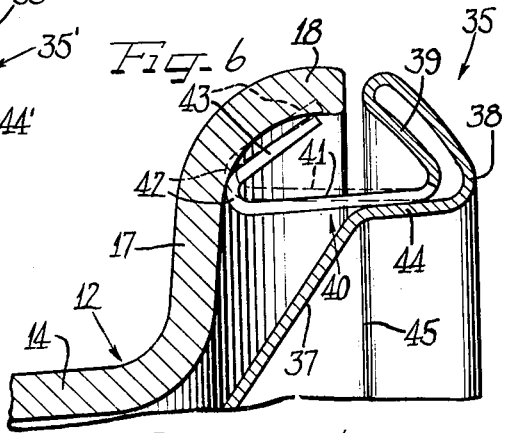
Inventor
GEORGE ALBERT LYON

United States Patent Office 2,963,320
Patented Dec. 6, 1960

2,963,320

WHEEL COVER

George Albert Lyon, 13881 W. Chicago Blvd., Detroit 28, Mich.

Filed July 27, 1956, Ser. No. 600,592

2 Claims. (Cl. 301—37)

The present invention relates to improvements in wheel structures and more particularly concerns the ornamental and protective covering of the outer sides of vehicle wheels.

With the advent of smaller wheels and more particularly the current virtual standardization upon wheels of fourteen inch diameter, as well as the ever-present urgency toward economy in production for lower prices, the desirability of providing wheel covers that will not only substantially entirely cover the outer side of the wheel inclusive of the terminal flange, but will also retainingly engage with the terminal flange, becomes manifest.

On the matter of economy, by having the cover retainingly engageable with the terminal flange, minimum material is required in the marginal portion of the cover for providing retaining fingers while none the less the cover is adapted for full coverage of the wheel inclusive of the terminal flange.

Since in order to accomplish these desirable ends, however, serious space limitations as well as size limitations are encountered with respect to the retaining fingers, important problems are encountered especially in respect to the provision of retaining fingers that will hold the cover with adequate security against unintentional displacement.

It is therefore an important object of the present invention to provide an improved wheel structure having novel ornamental and protective cover means and retaining structure therefore.

Another object of the invention is to provide improved cover retaining means especially suitable for small size wheels wherein it is desirable to retain the cover through the medium of structure behind the outer margin thereof and engageable with the terminal flange of the tire rim.

A further object of the invention is to provide novel retaining finger structure for engagement with a tire rim to hold a cover on the wheel.

Still another object of the invention is to provide a novel cooperative relation between retaining fingers formed on a cover margin and the cover margin whereby to render the fingers especially securely retentive with respect to a wheel flange with which they are engageable.

Yet another object of the invention is to provide an improved cover construction for disposition at the outer side of a vehicle wheel and wherein the cover margin that carries retaining fingers is substantially reinforced, is coperatively constructed for coaction with the retaining fingers in an improved manner and is especially provided with suitable means for effecting pry-off of the cover without injury to the cover from application of a pry-off tool therebehind.

Other objects, features and advantages of the present invention will be readily apparent from the following detailed description of certain preferred embodiments thereof taken in conjunction with the accompanying drawings in which:

Figure 4 is an enlarged fragmentary radial sectional detail view on the order of Figure 2 but showing in more explicit detail the construction and operation of the retaining fingers;

Figure 5 is a fragmentary edge elevational view of a modified wheel cover;

Figure 6 is a fragmentary radial sectional view through the margin of the cover of Figure 5 taken substantially on the line VI—VI and showing the cover as applied to a vehicle wheel; and Figure 7 is a fragmentary radial sectional view through a further modified wheel structure.

Figure 2:
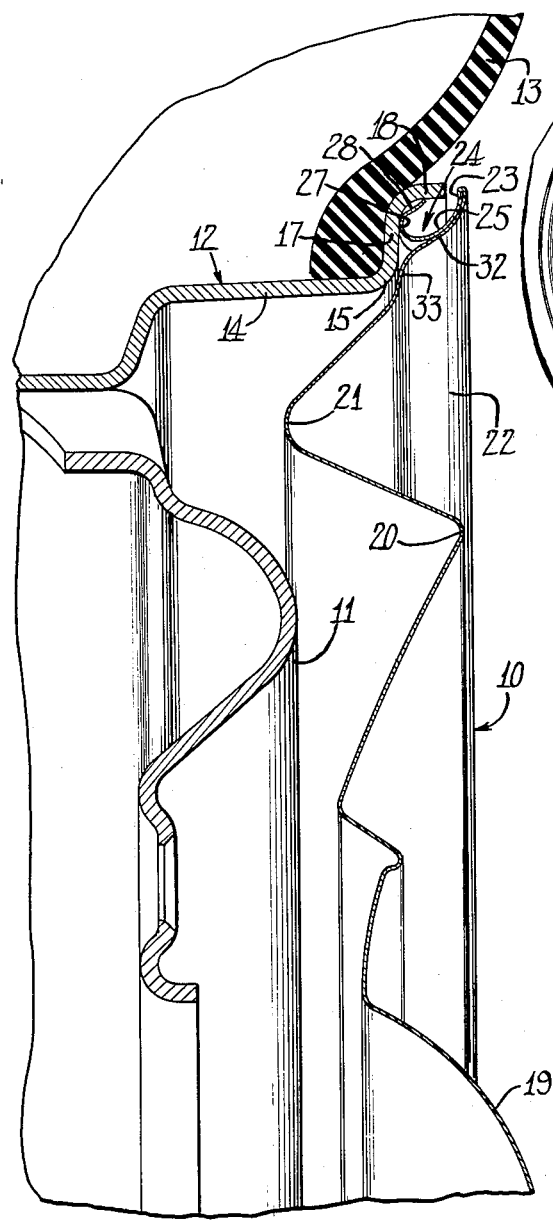
Figure 2 is an enlarged fragmentary radial sectional detail view taken substantially on the line II—II of Figure 1.

In Figures 1–4, a cover 10 is shown as constructed and arranged for disposition at the outer side of a vehicle wheel including a disk spider wheel body 11 and a tire rim 12 supported thereby. For supporting a pneumatic tire 13 such as a tubeless tire, the tire rim 21 is of the multi-flange, drop center type having an intermediate generally radially inwardly facing flange 14 which merges on a rounded shoulder 15 with a terminal flange including a generally radially outwardly extending and axially outwardly facing flange portion 17 and a generally axially outwardly turned and radially inwardly facing extremity or lip portion 18. As shown, the terminal flange extremity portion 18 may be substantially straight axially and may be either cylindrical or may be slightly angled from the cylindrical and preferably angled inboard such as 3° to 5° whereby not only to minimize engagement of the edge thereof with the side wall of the tire 13 upon the tire going flat, but also facilitating retentive engagement thereof by cover retaining finger means. On the other hand, the angle of the flange portion 18 may be slightly outboard, if preferred.

Although the cover 10 is shown as comprising a full disk cover, that is, of a one piece sheet metal plate of a diameter to cover not only the wheel body 11 but also the tire rim 12, it could, if desired, comprise a trim ring type of cover for overlying the tire rim and an adjacent portion of the wheel body 11 between a central hub cap and the tire rim. Stainless steel, brass or other suitable sheet or strip material may be utlizied in fabricating the cover 10 and may be stamped or drawn into the preferred shape. Herein, the cover 10 includes a central wheel-body-overlying crown portion 19 having therabout a generally axially outwardly projecting rib-like formation 20, with an annular axially inwardly dished intermediate portion 21 that is adapted to overlie the juncture area between the wheel body and the tire rim and is provided at the radially outer side thereof with a generally radially and axially outwardly projecting marginal cover portion 22 for overlying the tire rim. At its outer extremity the outer marginal cover portion 22 is adapted to lie adjacent to the tip of the terminal flange extremity portion 18, and is provided with an underturned finishing and reinforcing flange 23 which, in this instance, is returnbent to lie in reinforcing relation behind the extremity portion of the marginal annular section 22 of the cover.

For self-retaining engagement of the cover 10 with the wheel, retaining fingers are provided on the cover behind the outer marginal portion 22 for press-on, pry-off interengagement with the tire rim and more particularly with the terminal flange of the rim. Herein retaining fingers 24 are constructed as integral one piece extensions from the underturned marginal flange 23. The fingers 24 may be provided by groups or they may be provided as a continuous spaced series about the entire circumference of the cover. As shown, each of the fingers 24 includes a body leg portion 25 merging on a return-bent juncture 27 with a retaining leg 28 having a retaining terminal extremity 29.

Since the available space for accommodating the retaining fingers 24 is quite limited, and therefore only a limited amount of material may be included in each of the fingers 24, a special construction and relationship of the fingers to the cover and to the rim flanges is provided. To this end, the retaining finger body legs 25 are constructed in both longitudinally arcuate and circumferentially arcuate form so that even though the body legs are rather short and thus afford only a limited amount of material to be cold worked for resilience, they will be functionally adequately resilient for the purpose. Each of the finger legs 25 is longitudinally arcuate by being bowed radially inwardly and is of a substantial width at juncture with the underturned flange 23, tapering toward the finger leg juncture 27. Merger of the body leg or flange 25 of the finger with the leg juncture or bight of the generally U-shaped retaining finger is on a smooth continuous radius and juncture of the retaining leg 28 of the finger with the juncture bend or bight of the finger 27 is also on a smooth, continuous curvature. It will be observed, however, from Figure 3, that the taper of the sides of the retaining finger body legs 25 is continuous throughout the length of the fingers inclusive of the juncture 27 and the retaining leg 28 as well as the tip portion 29. While the finger body leg 25 is of fairly stiff resilience, gradually attaining slightly greater resilient deflectability axially inwardly toward the juncture or bight portion 27, the resilient stiffness is gradually less in the radially outer portion of the juncture portion 27 and in the generally axially outwardly directed retaining leg 27. However, since the retaining leg 28 is even shorter than the body leg 25 and the curvature of the juncture portion 27 is continuous and thus affords no defined bend line thereacross, an effective resilient retaining spring is afforded by the retaining finger 24 in each instance.

In addition, by having the retaining terminal extremity 29 of each of the retaining fingers short and stiffened by virtue of its shortness and its generally radially outward angularity to the retaining leg 28, the resilient resistance to deflection of the retaining leg 28 is improved.

In applying the cover 10 to the outer side of the wheel, a valve stem aperture 30 in the dished annular intermediate cover portion 21 is registered with a valve stem 31 and the cover pressed axially inwardly into retained position on the wheel. In so doing, the retaining finger terminals 29 which normally project to a slightly larger diameter than the inside diameter of the terminal flange extremity portion 18 as shown in dash outline in Figure 4, are cammed radially inwardly until the edge extremities of the terminals engage grippingly with the inner face of the rim flange portion 18. As the terminals 29 are cammed radially inwardly, the retaining fingers are resiliently deflected radially inwardly. As an incident to such radially inward deflection of the retaining fingers 24, the body leg portions 25 thereof are caused to progressively back up, from a divergent relation, toward and against a backup shoulder 32 provided by the cover marginal portion 22 radially inwardly adjacent to their axially outer end portions, and thus the wider end portions of the finger bodies 25 while the axially inner portions of the finger bodies diverge from the shoulder. This backup shoulder is provided by a generally concave or axially outwardly generally dished transverse formation of the outer section of the marginal portion 22, and defining a groove or channel into which the underturned flange 23 projects and from which the fingers 24 project. The axially outer portions of the finger legs 25 thus back up into a substantially nested relation with the generally radially and axially inwardly sloping backup shoulder 32 and the flexure leverage of the finger legs 25 and hence of the fingers as a whole is shortened so that the fingers become progressively resiliently stiffer as the same are compressed in retaining engagement with the terminal flange extremity portion 18. Since such compression is uniform about the entire circumference of the cover, it will be apparent that the retaining fingers 24 cumulatively under the resiliently tensioned thrust of the respective retaining terminals into gripping retaining endwise engagement with the inner face of the retaining terminal flange 18 retain the cover effectively upon the wheel against axially outward displacement. The multiple side corners of the retaining tips of the terminals 29 hold the cover against turning relative to the wheel, so that registration of the valve stem aperture 30 with the valve stem 31 is properly maintained in service.

Axially inward disposition of the cover 10 on the wheel is determined in the present instance by engagement of the juncture bends 27 of the retaining fingers with the axially outwardly facing terminal flange portion 17. Thereby the juncture bends provide stops shouldering against the flange portion 17 of the rim. Thereby, also, the edge of the cover is maintained in predetermined spaced relation to the terminal flange tip for not only accommodating balancing weight clips that customarily engage over the terminal flange tip, but also affording a gap between the cover edge and the terminal flange through which dirt or water can escape, especially by centrifugal force in the running of the wheel.

For removing the cover 10 from the wheel, a pry-off tool such as a screwdriver or the like is inserted into the gap between the reinforced turned cover edge and the tip of the terminal flange 18 and pry-off leverage exerted. Since the outer extremity section of the marginal portion 22 of the cover is of transversely arcuate shape, it serves as a reinforcing rib which facilitates pry-off without damaging distortion of the cover.

In addition, a reinforcing and pry-off rib formation 33 is provided in the marginal portion 22 of the cover, in the present instance comprising an indented annular generally axially inwardly extending rib. By preference, the rib 33 which not only reinforces the cover margin but also serves as a pry-off rib or shoulder, is located radially inwardly adjacent to the retaining fingers 24 and disposed to lie generally in opposed relation to the rim shoulder 15. Hence, the reinforcing and pry-off rib shoulder 33 is disposed conveniently accessible to the tip of the pry-off tool after the pry-off tool has been worked in behind the edge of the cover between a pair of the retaining fingers 24. Then, pry-off leverage can be exerted axially outwardly against the pry-off rib shoulder 33 either by levering the pry-off tool against the terminal flange tip 18, or against the juncture shoulder 15 of the tire rim.

As the pry-off tool pressure is exerted behind the cover margin, the retaining finger terminals 29 while resisting axially outward displacement along the radially inwardly facing surface of the terminal flange portion 18, are gradually so displaced. This is facilitated by the feature of a further amount of resilient compression range in the axially inner portions of the retaining fingers 24 so that as pry-off force is exerted axially outwardly a certain component of such pry-off force acting diametrically will tend to further compress the retaining fingers diametrically opposite to the point of pry-off tool application and thus tend to relieve somewhat the resilient tension of the retaining fingers adjacent to the point of pry-off pressure or force. Also, since the pry-off force is exerted axially outwardly fairly close to the adjacent fingers, and the finger legs 25 are substantially backed up by the shoulder 32 against turning further radially inwardly, axially outward pulling force is effected by the finger legs 25 on the juncture bight portions 27 of the fingers and thus axially outwardly on the generally axially outwardly directed retaining legs 28, and this causes the retaining terminals 29 to be forceably axially outwardly displaced until they are released from the terminal flange portion 18. Such release of the retaining fingers 24 is effected without any damage or any taking of a set from the normal condition of the fingers. Therefore, the cover is adapted to be applied to or removed from the wheel an indefinite number of times for replacement or interchange with respect to several of the wheels of the vehicle, as desired.

In the modification of Figures 5 and 6, a wheel cover 35 is shown which may in general respects be similar to the cover 10 in that it is adapted to be made as a single piece structure from suitable sheet metal and may comprise either a full disk cover or a trim ring type of cover, and it is adapted to be applied to the outer side of a vehicle wheel with retaining means on the cover engageable with the terminal flange. To this end, the cover 35 is provided with a body including an outer annular marginal portion 37 in the present instance having at the outer extremity thereof a reinforcing generally axially outwardly projecting annular reinforcing rib formation 38, with the edge extremity of the marginal portion arranged to overlie the tip of the terminal flange extremity portion 18 and having an underturned reinforcing and finishing flange 39.

The underturned flange 39 extends generally radially inwardly and axially outwardly to project into the axially inwardly opening groove or channel defined by the rib 38, and within such groove has projecting from the edge thereof retaining finger extensions 40.

Each of the fingers 40 includes a generally axially inwardly extending body leg portion 41 of substantial length joined by a juncture bend 42 to a generally axially and radially outwardly extending oblique retaining terminal leg 43. As best seen in Figure 5, each of the fingers is preferably of tapering side form, tapering from a substantially wider juncture of the body legs 41 with the underturned cover flange 39 to narrowest width at the tips of the retaining flange legs 43. Although the retaining fingers 40 may be disposed in a uniform series about the circumference of the cover, they may also, as shown, be provided in groups of fingers spaced rather closely, with the groups spaced substantially apart as for example at four equally spaced positions about the cover circumference. This enables the fingers to be made from the corners of a polygonal blank with a minimum of material in the blank.

Normally the retaining fingers 40 extend to a slightly larger diameter than in the assembled relation on the wheel, so that the tips of the retaining legs 43 of the fingers extend to a larger diameter than the inside diameter of the terminal flange extremity portion 18. Furthermore, the body legs 41 of the fingers preferably extend divergently generally axially inwardly and radially outwardly relative to a generally radially outwardly facing backup shoulder 44 provided at the radially inner side of the reinforcing marginal rib 38 of the cover margin. This backup shoulder opposes the axially outer end portions of the body legs 41 and at its axially inner end joins an indented generally axially inwardly and radially outwardly directed angular reinforcing rib and pry-off shoulder 45 from which the marginal portion 37 of the cover slants off generally radially and axially inwardly away from the retaining fingers 40.

Figure 1:
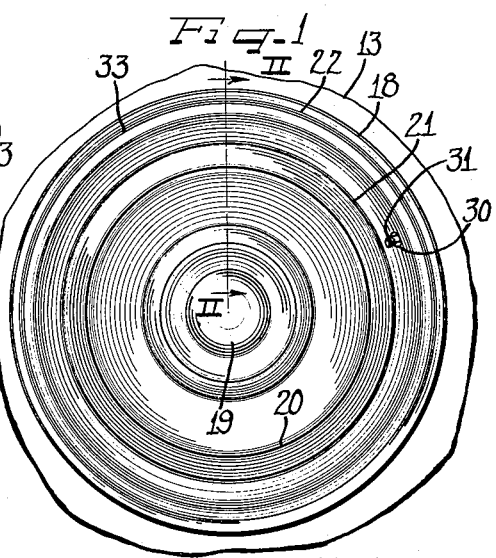
Figure 1 is an outer side elevational view of a wheel structure embodying features of the invention.
Figure 3:
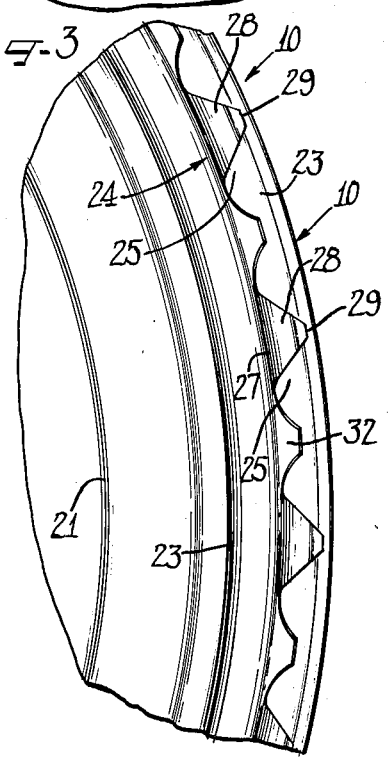
Figure 3 is a fragmentary rear elevational view of a marginal portion of the cover of Figure 2 showing the retaining fingers behind the margin thereof.

In applying the cover 35 to the outer side of the wheel, a valve stem aperture therein may be registered with a valve stem, similarly as the valve stem aperture 30 is registered with the valve stem 31 with respect to the cover 10 as depicted in Figure 1, and then axially inward pressure applied to the cover so that the retaining terminal legs 43 will cam inwardly on the tip of the terminal flange portion 18 of the rim and the fingers will thereby be deflected generally radially inwardly from the dash line position in Figure 6 to the full line position wherein the axially outer end portions of the finger legs 41 back up against the backup shoulder 44 whereby to shorten the flexure leverage of the fingers and substantially resiliently stiffen the same under the radially inward compression so as to develop substantial radially outward tension in the fingers for thrusting the tips of the finger legs 43 firmly grippingly against the radially inwardly facing surface of the terminal flange portion 18.

The finger body legs 41 are of a length substantially greater than the length of the terminal flange portion 18 so that when the cover has been fully pressed home on the wheel, the juncture shoulder bends 42 will bottom as stops against the adjacent terminal flange portion 17 and thereby hold the cover in axially inward disposition wherein the turned edge of the cover is maintained in spaced gap relation to the tip of the terminal flange portion 18. This gap enables water or dirt to be centrifugally ejected from behind the cover therethrough, and also enables application of a pry-off tool behind the edge of the cover for dislodging the cover from the wheel, the reinforcing and pry-off shoulder 45 being also suitable for this purpose. Since the clip body legs 41 although stiffly resilient so that some diametrical displacement of the cover toward the opposite side from the application of pry-off tool force is enabled, nevertheless substantially resist radially inwardly beyond the backed up retaining position so that adjacent to the application of pry-off force, the retaining fingers can be effectively pried free from the tire rim by the generally axially outwardly directed pry-off force which pulls the relatively short and stiff retaining terminal legs 43 from the retained, gripping engagement with the terminal flange portion 18.

Turn prevention may be afforded by means such as notching out of the tips of the retaining finger terminal legs 43 at suitable intervals as at 47 in order to afford a plurality of spur-like biting corners that effectively resist torsional stresses tending to turn the cover on the wheel.

In Figure 7 is shown a modification wherein a cover 35' is constructed and operates substantially like the cover 35 of Figures 5 and 6, but is modified in structure to enable efficient press-on, pry-off engagement with a terminal flange extremity portion 18' of a tire rim 12' turned slightly generally radially inwardly at its extremity, on the order of conventional tire rims so that a generally radially and axially inwardly facing shoulder 50 is afforded behind which the tips of the outwardly angled clip terminal legs 43' are engageable in assembly with the wheel. To accommodate this coaction, the retaining finger body legs 41' are shorter than the similar legs 41 in Figure 6 so that they are substantially stiffer and the flexure leverage of the finger is shorter. Moreover, the finger terminal legs 43' may be slightly lengthened so that when the fingers are in engagement with the terminal flange portion 18', the tips of the retaining legs will be engaged as close as practicable near the axially outer extremity of the radially inner surface of the terminal flange portion 18' as defined by the shoulder 50. Therefore, in effecting pry-off, the pry-off force exerted by the pry-off tool behind the turned edge of the cover and behind the pry-off shoulder 45', which it will be noted is located at least slightly axially inwardly relative to the tip of the flange 18' and opposite the terminal flange portion 17', is effective to dislodge the retaining finger terminals without undue leverage force even though engaged behind the more or less hook-shaped shoulder 50.

It will be understood that modifications and variations may be effected without departing from the scope of the novel concepts of the present invention.

I claim as my invention:

1. In a wheel structure including a generally radially facing annular portion, a cover member for disposition over the outer side of the wheel and including a generally axially outwardly bulged reinforcing rib-like marginal portion providing an annular channel-shaped formation at the inner side of the cover member opening generally toward said annular wheel portion and with the formation including a generally axially inwardly extending annular shoulder part radially spaced a limited distance from said wheel portion and affording an annular shoulder generally telescoped with relation to and facing toward said wheel portion, the cover member having an underturned marginal flange projecting into said channel and provided with cover retaining means comprising a circumferentially spaced series of generally axially inwardly extending retaining fingers having axially outer portions backed up into substantially nested relation with said shoulder and axially inwardly therefrom extending past said shoulder when the cover is off of the wheel and divergently spaced relation radially from said shoulder, said fingers having cover retaining terminal means retainingly engageable with said annular portion of the wheel and normally extending to a diameter which is in differential relation to the annular portion of the wheel compelling resilient flexure of the fingers toward said shoulder when the fingers are in engagement with said wheel portion, said differential being great enough so that when the cover is fully on the wheel the fingers are backed up resiliently against said shoulder progressively from said axially outer portion of the fingers throughout a substantial additional length of the fingers to thereby shorten the flexure leverage of the fingers and enhance the resilient tensioned engagement of said terminal means against the annular wheel portion.

2. A wheel structure as defined in claim 1 wherein the wheel has axially inwardly adjacent to said annular wheel portion a generally axially outwardly facing portion disposed in underlying relation to said cover member marginal formation and the retaining fingers have generally axially inwardly facing shoulders which are engageable against said axially outwardly facing wheel portion in the fully assembled relation of the cover member on the wheel and thereby support the cover member in entirely spaced relation to the wheel.

References Cited in the file of this patent

UNITED STATES PATENTS

| | | |
|---|---|---|
| 2,368,228 | Lyon | Jan. 30, 1945 |
| 2,404,389 | Lyon | July 23, 1946 |
| 2,624,635 | Lyon | Jan. 6, 1953 |
| 2,674,495 | Lyon | Apr. 6, 1954 |
| 2,675,271 | Lyon | Apr. 13, 1954 |
| 2,683,631 | Lyon | July 13, 1954 |
| 2,686,082 | Lyon | Aug. 10, 1954 |
| 2,690,357 | Lyon | Sept. 28, 1954 |
| 2,809,076 | Plotkin | Oct. 8, 1957 |

FOREIGN PATENTS

| | | |
|---|---|---|
| 509,850 | Canada | Feb. 8, 1955 |